March 27, 1951 M. M. BARTON 2,546,208
METHOD OF SEALING HOLLOW BODIES
Filed April 30, 1949
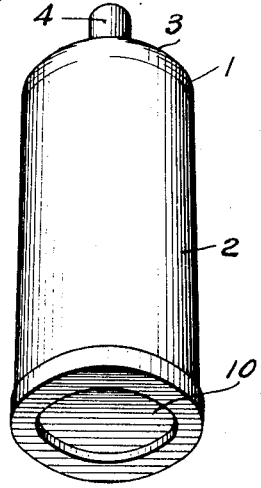
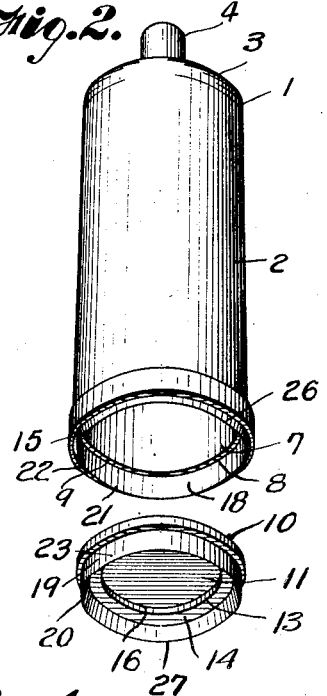
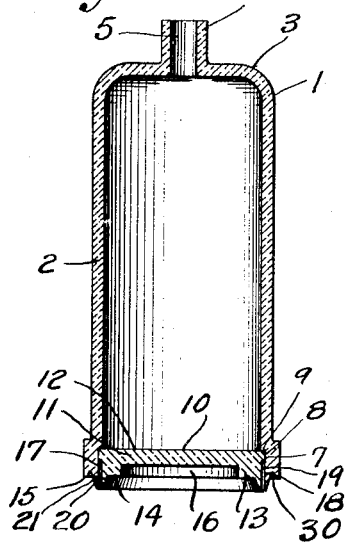
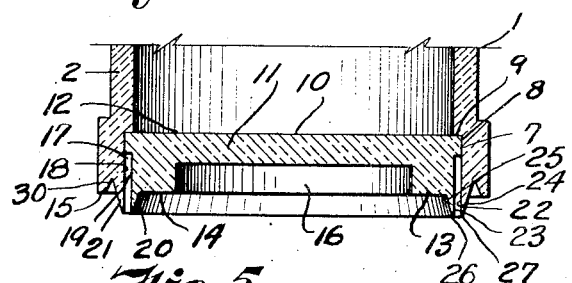
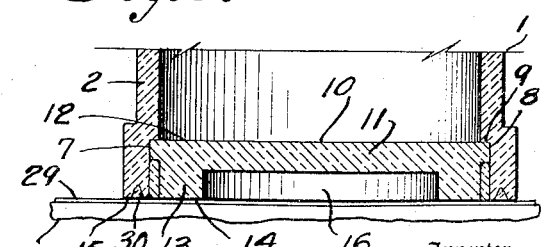
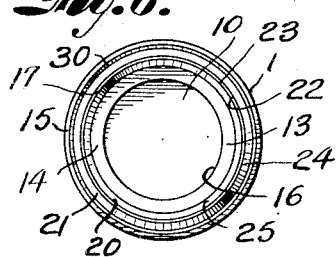
Inventor
Murray M. Barton
By Fishburn & Mullendore
Attorneys Patented Mar. 27, 1951

2,546,208

UNITED STATES PATENT OFFICE 2,546,208

METHOD OF SEALING HOLLOW BODIES

Murray M. Barton, Kansas City, Mo., assignor to Injection Molding Company, Kansas City, Mo., a corporation of Missouri Application April 30, 1949, Serial No. 90,723

4 Claims. (Cl. 18—59)

1

This invention relates to a method of making hollow bodies such as bottles, etc. from a plastic material by molding in high production dies.

Heretofore it has been impossible to form hollow bodies such as bottles from plastic materials in high production dies for the reason that the neck openings are not of sufficient size to permit withdrawal of the core element of the mold.

It is, therefore, the purpose of the present invention to provide a method for making hollow bodies, particularly bottles, so that they may be formed of plastic material.

Other objects of the invention are to provide a structure having an opening of ample size and shape to permit withdrawal of the core element of a mold and which is adapted to be closed by an insert that is quickly and inexpensively sealed in place to form an integral structure.

A further object of the invention is to provide a method of permanently securing a thermoplastic closure to an open end wall portion of a thermoplastic container.

In accomplishing these and other objects of the invention as hereinafter pointed out, I have provided improved structure, the preferred form of which is illustrated in the accompanying drawing wherein:

Fig. 1 is a perspective view of a hollow body in the form of a bottle and which is constructed in accordance with the present invention.

Fig. 2 is a similar view showing the parts of the bottle in spaced relative relation to better illustrate the construction.

Fig. 3 is a vertical section through the bottle showing the parts assembled and ready to be sealed together.

Fig. 4 is an enlarged sectional view through the base of the bottle shown in Fig. 3 to better show the sealing lips prior to fusing thereof.

Fig. 5 is a similar section showing the bottom of the finished bottle.

Fig. 6 is a bottom view of the bottle prior to fusing of the sealing lips.

Referring more in detail to the drawings:

1 designates a hollow body which may be in the form of a bottle having a side wall 2 that may be of cylindrical formation and have a dome-shaped top 3 provided with a neck 4 of substantially smaller diameter than the inner diameter of the wall 2, the neck 4 being provided with an axial opening 5 through which the bottle is filled and the content removed when the bottle is in use. The bottle has a bottom 6 constructed in accordance with the present invention to permit formation of the bottle in high production molds.

2

It has been found desirable to form such hollow bodies from plastic materials since the present day plastics would result in many advantages over the usual metal and glass. For example, such containers could be transparent or opaque, colored, light in weight, shatter-proof, and provided with flexible walls if desired. However, to manufacture such articles of plastics on a commercial basis in high production dies, they must be formed under heat and pressure which requires a core to form the interior shape thereof and to my knowledge no practical method has been previously devised to permit removal of the core.

The present invention contemplates removal of the core by providing the bottle with an axial bottom opening 7 equal in size or preferably larger than the interior diameter of the opening through which the core may be readily removed. In the illustrated instance the opening 7 is of a shape corresponding to the interior cross sectional shape of the bottle and of larger size to provide an annular inset shoulder 8 to form a stop face 9 for seating a closure member 10 constituting the bottom 6. The member 10 consists of a disk-like body 11 having a substantially flat upper face 12 and outer flange 13 provided with a flat face 14 substantially registering with the end face 15 of the wall 2. The disk member thus has a central recess 16 so that the face portions 14 and 15 form a base or rim on which the bottle is adapted for support. The flange 13 is of smaller outer diameter than the inner diameter of the opening 7 so as to leave an annular space or groove 17 between the inner circumferential face 18 of the opening and the outer circumferential face 19 of the flange 13 when the disk member is inserted within the opening and engaging the stop face 9 of the shoulder 8.

In order to seal the insert, the flange 13 of the disk member and wall 2 have depending lips 20 and 21 each having inner and outer faces 22 and 23 respectively registering with and forming continuation of the circumferential faces 18 and 19. The opposite faces 24 and 25 of the lips are tapered from the base faces 14 and 15 to provide relatively thin terminal edges 26 and 27 as shown in Fig. 4. The lips contain in themselves a sufficient amount of material to effect substantial fill of the groove 17 when the lips are fused together. Fusing of the lips is effected by pressing the base of the container against a plane surface of a suitable heater indicated at 28 (Fig. 5), a sheet of material 29 having been inserted between the lips and face of the heater to prevent sticking of the lips to the hot surface of the heater. Upon contact with the heated surface the relatively thin terminal edges 26—27 of the lips readily melt and the pressure applied by the bottle brings the melted material together over the groove 17 and the action is such that the melted material enters the groove 17 to form a liquid-tight seal as shown in Fig. 5. When thus formed, the bottom faces 14 and 15 are joined on a continuous plane and form a smooth surface on which the bottle is adapted for support in an upright position. If desired, an annular groove 30 may be provided in the face 15 at the base of the lip 20 to receive any overflow that may occur from fusion of the lips.

From the foregoing it is obvious that the parts as described may be readily produced from plastic material in high production molds or dies and that when the inserts are assembled within the opening from which the inner mold or core is drawn, the insert is quickly and easily sealed therein to provide an integral structure.

Moreover, from the foregoing, it will be readily apparent that there is provided a novel method of permanently securing the closure to the end wall portion of the container and wherein the closure and the container are of thermoplastic material and that the closure is substantially complemental in size and shape with the open end of the container. The closure, it will be seen, has the right-angularly disposed flange on its outer face substantially at the margin thereof and, when the closure is disposed within the open end portion of the container, this flange extends outwardly and terminates in substantially the same plane as the end wall of the container so that the flange on the closure is surrounded by this end wall portion of the container. In this manner, continuous outer terminal ends of the end portion of the container and the end of the flange are presented outwardly. The heat and pressure are applied to the outwardly presented flanges or lips and, where the recess is provided between the lips and the inner wall portion of the container, it is apparent that by application of heat and pressure, at least some of the fused material will flow into the recess; whereas, in other instances, the extreme outer end of the end portion of the container and the extreme outer end of the flange are simply fused and flowed and form the seal between the closure and the container.

It is obvious that, after the seal between the closure and the container has been formed, the same is allowed to become set, by cooling or otherwise, and the final seal, which is continuous about the closure and container, and on the bottom as disclosed in the drawing, is effected. Thus, in carrying out the method, the flange closure is simply inserted into the open end of the container and may engage a stop means therein and, after this is accomplished, the application of the heat and pressure to the outer terminal edges of the flange and the extreme end portion of the container wall is effected and this results in forming the continuous seal between the container and the closure or vice versa, then this seal is allowed to cool, by removing the heat and pressure applying means from it, and, as aforesaid, the final cooled and effected seal is attained.

What I claim and desire to secure by Letters Patent is:

1. The method of permanently securing a thermoplastic closure to an open end wall portion of a thermoplastic container, the closure and the end wall portion being substantially complemental in size and shape, the closure having a continuous right angularly disposed flange on its outer face substantially at the margin thereof, which comprises inserting the closure into the open end of the container with the flange facing outwardly and terminating in substantially the same plane as the end wall of the container whereby said flange is surrounded by the end wall portion of the container thus presenting continuous outer terminal ends, applying heat and pressure to and coextensive with said terminal ends to fuse portions thereof and flow together the fused material, removing the heat and pressure, allowing the flowed fused material to cool and become set to form an integral seal between the flange of the closure and the end wall portion of the container.

2. The method of permanently securing a thermoplastic closure to an open end wall portion of a thermoplastic container, there being a stop means inwardly of the open end of the container, the closure and the end wall portion being substantially complemental in size and shape, the closure having a continuous right angularly disposed flange on its outer face substantially at the margin thereof, which comprises inserting the closure into the open end of the container to engage the stop means with the flange facing outwardly and terminating in substantially the same plane as the end wall of the container whereby said flange is surrounded by the end wall portion of the container thus presenting continuous outer terminal ends, applying heat and pressure to and coextensive with said terminal ends to fuse portions thereof and flow together the fused material, removing the heat and pressure, allowing the flowed fused material to cool and become set to form an integral seal between the flange of the closure and the end wall portion of the container.

3. The method of permanently securing a thermoplastic closure to an open end wall portion of a thermoplastic container, the closure and the end wall portion being substantially complemental in size and shape, the closure having a continuous right angularly disposed flange on its outer face substantially at the margin thereof and adapted to form with the end wall portion an outwardly opening recess, which comprises inserting the closure into the open end of the container with the flange facing outwardly and terminating in substantially the same plane as the end wall of the container whereby said flange is surrounded by the end wall portion of the container thus forming the outwardly opening recess therebetween and presenting continuous outer terminal ends, applying heat and pressure to and coextensive with said terminal ends to fuse portions thereof and flow together the fused material into said recess, removing the heat and pressure, allowing the flowed fused material to cool and become set to form an integral seal between the flange of the closure and the end wall portion of the container.

4. The method of permanently securing a thermoplastic closure to an open end wall portion of a thermoplastic container, the closure and the end wall portion being substantially complemental in size and shape, the closure having a continuous right angularly disposed flange on its outer face substantially at the margin thereof and adapted to form with the end wall portion an outwardly opening recess, and the flange and end wall having continuous outwardly projecting lips, which comprises inserting the closure into the open end of the container with the flange facing outwardly and terminating in substantially the same plane as the end wall of the container whereby said flange is surrounded by the end wall portion of the container thus forming the outwardly opening recess therebetween and presenting the continuous outwardly projecting lips in side-to-side relation, applying heat and pressure to and coextensive with said lips to fuse said lips and flow together the fused material of said lips into said recess, removing the heat and pressure, allowing the flowed fused material to cool and become set to form an integral seal between the flange of the closure and the end wall portion of the container.

MURRAY M. BARTON.

REFERENCES CITED

The following references are of record in the file of this patent:

UNITED STATES PATENTS

| Number | Name | Date |
|---|---|---|
| 1,678,330 | Clyne | July 24, 1928 |
| 2,099,057 | Ferngren | Nov. 16, 1937 |
| 2,169,315 | Yngve | Apr. 15, 1939 |
| 2,219,576 | Moreland | Oct. 29, 1940 |
| 2,220,545 | Reinhardt | Nov. 5, 1940 |
| 2,319,683 | Hofmann | May 18, 1943 |